United States Patent
Gaither et al.

(10) Patent No.: US 7,366,803 B1
(45) Date of Patent: Apr. 29, 2008

(54) INTEGRATED CIRCUIT FOR BUFFERING DATA BY REMOVING IDLE BLOCKS TO CREATE A MODIFIED DATA STREAM WHEN MEMORY DEVICE IS NOT NEAR EMPTY

(75) Inventors: Justin L. Gaither, Austin, TX (US); Alexander Linn Iles, Austin, TX (US)

(73) Assignee: Xilinx, Inc., San Jose, CA (US)

( * ) Notice: Subject to any disclaimer, the term of this patent is extended or adjusted under 35 U.S.C. 154(b) by 501 days.

(21) Appl. No.: 11/063,489

(22) Filed: Feb. 23, 2005

(51) Int. Cl.
*G06F 13/00* (2006.01)
*G06F 3/00* (2006.01)
*H04L 12/28* (2006.01)

(52) U.S. Cl. .................. 710/54; 710/1; 710/4; 710/52; 710/57; 710/65; 370/363; 370/412; 370/505

(58) Field of Classification Search .................. 710/1, 710/4, 52–54, 57, 65; 370/363, 505, 412
See application file for complete search history.

(56) References Cited

U.S. PATENT DOCUMENTS

| | | | |
|---|---|---|---|
| 6,693,918 B1 | 2/2004 | Dallabetta et al. | |
| 6,751,235 B1 | 6/2004 | Susnow et al. | |
| 6,882,661 B1 * | 4/2005 | Creedon et al. | 370/505 |
| 6,891,845 B2 * | 5/2005 | Boock et al. | 370/412 |
| 7,209,907 B2 * | 4/2007 | Cherukuri et al. | 706/16 |
| 2005/0286507 A1 * | 12/2005 | Osterling | 370/363 |

OTHER PUBLICATIONS

Xilinx, Inc.; Justin Gaither and Marc Cimadevilla; XAPP775 (v1.0); "10 Gigabit Ethernet/FibreChannel PCS Reference Design"; Aug. 25, 2004; available from Xilinx, Inc., 2100 Logic Drive, San Jose, California 95124; pp. 1-7.

* cited by examiner

*Primary Examiner*—Tammara Peyton
(74) *Attorney, Agent, or Firm*—John J. King (57) ABSTRACT

A circuit for buffering data is disclosed. The circuit comprises a first circuit which is coupled to receive a stream of data blocks using a first clock signal. The first circuit removes data blocks, such as idle data blocks or a sequence ordered set of a pair of consecutive sequence ordered sets, from the stream of data blocks to create a first modified data stream which is coupled to a memory device. Finally, a second circuit coupled to the memory device generates a second modified data stream using a second clock signal. The second modified data stream preferably comprises the data blocks of the first modified data stream and idle data blocks inserted among the data blocks of the first modified data stream. Methods of buffering data received in a first clock domain and output in a second clock domain are also disclosed.

14 Claims, 6 Drawing Sheets

INTEGRATED CIRCUIT FOR BUFFERING DATA BY REMOVING IDLE BLOCKS TO CREATE A MODIFIED DATA STREAM WHEN MEMORY DEVICE IS NOT NEAR EMPTY

FIELD OF THE INVENTION

The present invention relates generally to the transmission of data, and in particular, to circuit for and a method of buffering data received in a first clock domain and output in a second clock domain.

BACKGROUND OF THE INVENTION

Memory devices are important components of many integrated circuits or products having integrated circuits. Because memories are so significant to the operation of these devices, it is important that data stored in a memory device can be correctly accessed. Data can be written to a memory and read from a memory using a single clock signal. Such memories enable synchronous data transfers. However, data could also be asynchronously transferred in memory devices which receive data and output data using two separate asynchronous clocks. Asynchronous clocks not only have a different phase, but also have a different frequency.

Memory devices also have various protocols for outputting stored data. For example, a first-in first-out (FIFO) memory is a memory device where a data sequence can be written to and retrieved from the memory in exactly the same order. Because no explicit addressing is required, the write and read operations can be completely independent and use unrelated clocks. While the concept of a FIFO is simple, the implementation of an asynchronous FIFO in an integrated circuit is often difficult. One common implementation of an asynchronous FIFO is a random access memory (RAM) having two independently clocked ports (i.e. one for writing and one for reading), and two independent address counters to steer write and read data. However, synchronizing and decoding the two ports operating at two asynchronous frequencies can require significant engineering effort to ensure that they are tolerant to variations in clock signals.

Conventional clock tolerant FIFOs implement a mechanism in which an idle data block is either removed or inserted dependent upon how full or empty the FIFO is at a particular time. The decision to remove or insert idle data blocks according to conventional devices is either made on the read side or the write side of the FIFO. The decision circuit determines whether to remove or insert an idle, and then performs the action by modifying the address counter or multiplexing in data. However, such conventional devices require additional circuitry, such as a variable increment address counters enabling incrementing an addresses pointer by a variable number at the output of the FIFO depending upon how many data blocks were removed at an input to a FIFO. Further, the circuit on the read side for preventing the memory from becoming empty must know the status of the circuit on the write side for preventing the memory from becoming empty, making the FIFO even more complex.

Accordingly, there is a need for an improved circuit and method of method of buffering data received in a first clock domain and output in a second clock domain.

SUMMARY OF THE INVENTION

A circuit for buffering data received in a first clock domain and output in a second clock domain is disclosed. The circuit comprises a first circuit which is coupled to receive a stream of data blocks using a first clock signal. The first circuit removes data blocks from the stream of data blocks to create a first modified data stream which is coupled to a memory device. The data blocks removed from the data stream could be idle data blocks or an ordered set of a pair of consecutive ordered sets. The memory device, which could be a dual port FIFO for example, selectively outputs the data blocks of the first modified data stream. Finally, a second circuit coupled to the memory device generates a second modified data stream using a second clock signal. The second modified data stream preferably comprises the data blocks of the first modified data stream and idle data blocks inserted among the data blocks of the first modified data stream. First and second near empty signals can be used by the memory to prevent the memory from becoming empty. Finally, data could be decoded before being written to the memory, thereby eliminating the requirement that the data be decoded again after being output by the memory.

Methods of buffering data received in a first clock domain and output in a second clock domain according to embodiments of the invention are also disclosed. According to one embodiment, a method comprises steps of removing data blocks from a stream of data blocks to be coupled to a memory device; coupling the remaining data blocks of the stream of data blocks to the memory device; outputting the data blocks from the memory device; and inserting idle data blocks among the data blocks output from the memory device. According to other embodiments, methods of employing different near empty signals for writing data to and reading data from a memory are also disclosed. Further, methods of decoding data input to the memory to prevent having to decode the data after it is output are also disclosed.

DETAILED DESCRIPTION OF THE DRAWINGS

Figure 1:
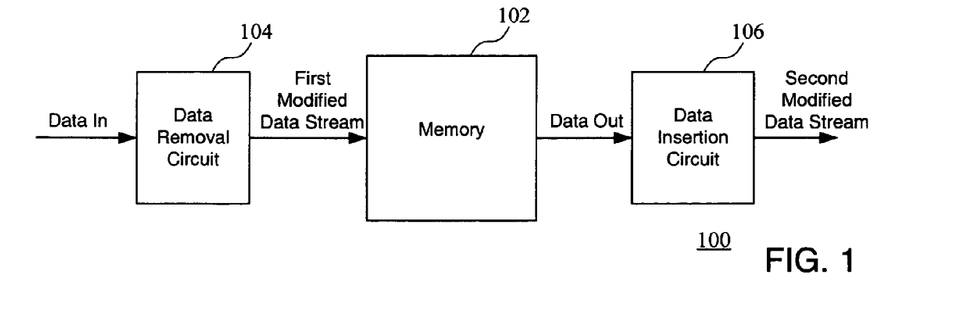
FIG. 1 is a block diagram of a circuit for buffering data according to an embodiment the present invention.

Turning first to FIG. 1, a block diagram of a circuit for buffering data according to an embodiment the present invention is shown. A memory device 102 is coupled to receive a stream of data blocks (Data In) at an input of a data removal circuit 104. The data removal circuit 104 selectively removes data from the stream of data blocks to generate a first modified data stream which is coupled to the memory device 102. According to one aspect of the invention, the function of the data removal circuit could be implemented by controlling the write enable signal to the memory, thereby only enabling writing to the memory when data other than idle or redundant data is present. The data which is removed could be, for example, idle blocks, or redundant data, such as data in consecutive ordered sets. The data is then selectively output by the memory. Because data may not be continuously output by the memory device 102, a data insertion circuit 106 provides idle data between data output by the memory in order to create a continuous stream of data in a second modified data stream. That is, in order to prevent the memory from becoming empty, data may not be output from the memory at a rate required at the output of the memory. Idle data is inserted in gaps in the output data stream, Data Out. Accordingly, rather than clocking data out of the memory, idle data is inserted by a data insertion circuit 106 to generate a second modified data stream.

According to one aspect of the circuit of FIG. 1, by monitoring the amount of data in the memory, a continuous stream of data is provided in the second modified data stream without having to know what data is input to the memory, and the timing of the data. Because the data may be output at a different rate than the rate that data is input to the memory (e.g. the data rate for outputting data may be greater than the data rate to input data), it is important to monitor the amount of data to ensure that the memory does not run out of data. Further, by removing idle or otherwise redundant data input to the memory, the effective data rate of data input to the memory will be lower than the data rate of data output from the memory.

Further, it is important to prevent the memory from outputting data faster than data is input to the memory, and therefore preventing the memory from running out of data. This is accomplished according to the embodiment of FIG. 1 by inserting idle data blocks between certain data blocks output by the memory, rather than reading data from the memory. It should be understood that the functional blocks coupled to the memory of FIG. 1, as well as the functional blocks coupled to the FIFOs of FIGS. 2 and 3 below, could be implemented in hardware, software, or a combination of hardware and software. Similarly, although the functions of the data removal circuit and data insertion circuit are shown separate from the memory device, these functions could be implemented by the memory device, which could comprise both memory cells for storing data as well as logic for controlling the memory cells.

Figure 2:
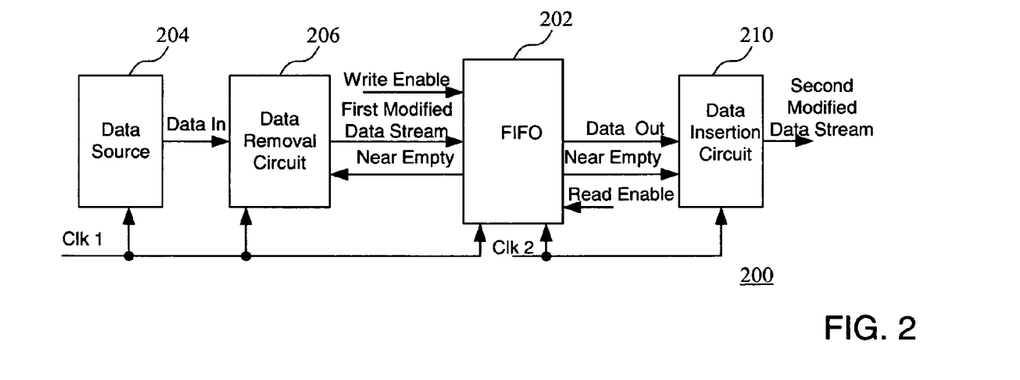
FIG. 2 is a block diagram of a circuit having a FIFO for buffering data according to an alternate embodiment of the present invention.

Turning now to FIG. 2, a block diagram of a circuit having a FIFO for buffering data according to an alternate embodiment of the present invention is shown. As can be seen in the embodiment of FIG. 2, a FIFO 202 receives data from a data source 204 by way of a data removal circuit 206. The data removal circuit 206 generates a first modified data stream as described above with respect to FIG. 1. The data removal circuit also receives a Near Empty signal from the FIFO 202 to avoid removing data from the stream of data blocks in the event that the FIFO is near empty. For example, on start up, the data removal circuit 206 will avoid removing idle data blocks in order to enable the FIFO to store data to be output. While all idles are preferably removed after a start-up phase, an idle may not be removed in certain circumstances, such as to comply with a data transfer standard as will be described in more detail in reference to FIG. 3.

A data insertion circuit 210 receives both the output of the FIFO and the Near Empty signal from the FIFO. When the near empty signal is active (or High), the FIFO could stop outputting data to the data insertion circuit 210, causing the data insertion circuit 210 to insert idle data blocks in order to generate the second modified data stream. Finally, as shown in the embodiment of FIG. 2, a first clock signal (Clk 1) and a second clock signal (Clk 2) are used to write data to and read data from the memory, respectively. As described above, the data removal circuit 206 and the data insertion circuit 210 enable the first and second clock signals to be asynchronous.

Several factors must be considered in order to determine FIFO depth and Near Empty flag levels, including the difference in clock frequency between the first clock domain and the second clock domain and the maximum allowable data packet length. Additionally, consideration should be made about the density of packets and packet sizes. These factors are considered such that when a near empty flag is asserted there is enough room in the FIFO to allow a maximum size packet, with maximum difference in clock frequency, to continue through the FIFO without inserting idle and still not result in an empty FIFO. This is necessary because under most circumstances idles may only be inserted after the end of packet indicator or another idle.

An example of a FIFO 202 can be found in the Virtex V4 Field Programmable Gate Array from Xilinx, Inc. of San Jose, Calif. An implementation of FIG. 2 is described in the Verilog code in the Appendix and is herein incorporated by reference.

Figure 3:
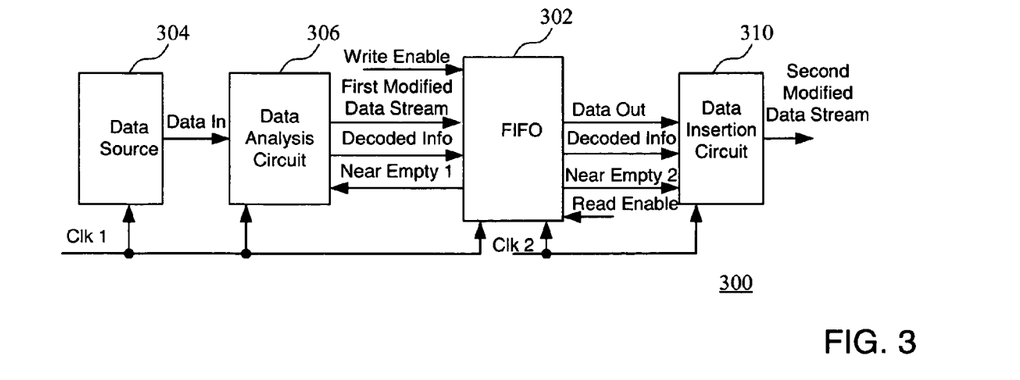
FIG. 3 is a block diagram of a circuit having a data analysis circuit coupled to a FIFO for buffering data according to an alternate embodiment of the present invention.

Turning now to FIG. 3, a more detailed block diagram of a circuit having a data analysis circuit coupled to a FIFO for buffering data according to an alternate embodiment of the present invention is shown. As can be seen in the embodiment of FIG. 3, a FIFO 302 receives data from a data source 304 by way of a data analysis circuit 306. In addition to generating a first modified data stream as described above with respect to FIG. 2, the data analysis circuit 306 also decodes the data and generates decoded information which is provided to the FIFO 302. Because there may be restrictions regarding removing data from the stream of data blocks input to the memory depending upon the application of the circuit of FIG. 3, it may necessary for the data removal circuit to know what type of data is being sent. For example, it may be necessary after a terminate data block to include an idle data block. Therefore, if a terminate block is detected, an idle data block after the terminate block would not be removed. By decoding the data, it is possible to determine whether to remove an idle data block. The decoded information is also preferably output by the FIFO and included in the second modified data stream. Because it is also then not necessary for the data output by the FIFO to be decoded when it is read from the FIFO, the circuit of FIG. 3 takes advantage of the previously decoded information, thereby simplifying the processing of reading data from the FIFO.

Because different clock signals are used to write data to and read data from the FIFO, separate Near Empty signals could be used to ensure that the FIFO does not become empty. That is, the data analysis circuit 306 receives a Near Empty 1 signal from the FIFO 302 to avoid removing data from the stream of data blocks in the event that the FIFO is near empty, while the data insertion circuit receives a Near Empty 2 signal to avoid outputting the data from the FIFO and causing the memory to become empty. The Near Empty signals also preferably have different threshold levels. For example, the Near Empty 2 signal could have a higher threshold (i.e. Near Empty 2 would be active (or High) earlier than the Near Empty 1 signal if the output data rate of the FIFO is greater than the input data rate to the FIFO) in order to prevent the FIFO from becoming empty. Preferably, Near Empty 2 is set up to keep the FIFO half full. Finally, the data insertion circuit 310 would then insert idle data blocks among the data blocks output by the FIFO to generate a second modified data stream having continuous blocks of data.

Figure 4:
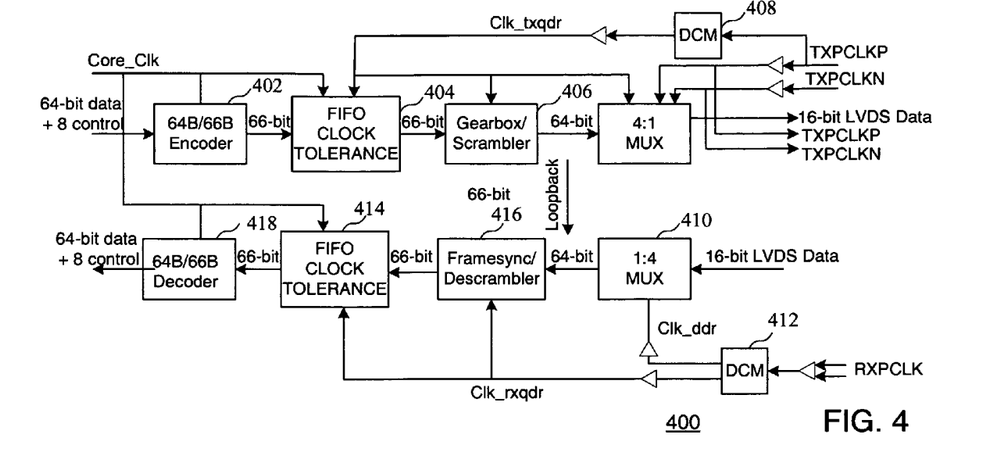
FIG. 4 is a block diagram of data transceiver according to an embodiment of the present invention.

Turning now to FIG. 4, a block diagram of data transceiver according to an embodiment of the present invention is shown. Although the embodiments of the present invention could be used with any data transmission protocol, the various embodiments provide particular advantages in high speed data transceivers. For example, the circuit of FIG. 4 could be employed to enable the Physical Coding Sublayer (PCS) of a 10 Gigabit Ethernet data channel according to the IEEE 802.3ae 10 Gigabit Ethernet standard. The Serial Physical Medium Attachment (PMA) required to implement the 10 Gigabit Ethernet standard could be implemented using a Xilinx RocketPHY 10 Gigabit Transceiver, for example, and the MAC layer can be implemented using the Xilinx LogiCORE 10 Gigabit Ethernet MAC, for example, both of which are available from Xilinx, Inc. of San Jose, Calif. The circuit 400 of FIG. 4 has been optimized to reduce the number of clocking resources needed within an FPGA, which will be described in more detail in reference to FIG. 5. A Core_clk is setup to be a global clock resource that is used by other circuits inside the FPGA, such as the 10 Gigabit Ethernet MAC. An important feature of the circuit of FIG. 4 is that both transmit and receive data paths have clock tolerance buffers, thereby allowing the Core_clk to be asynchronous to the TXPCLKP/N and RXPCLK clocks. Clock synchronization of the system is greatly simplified, allowing independent clocks to be used for the 644.53125 MHz 16-bit XSBI interface and the 156.25 MHz system clock (Core_clk). Accordingly, an embodiment of the circuit of the present invention eliminates the need for an external phase-locked loop (PLL) to synchronize these two clocks.

Referring specifically to the block diagram of FIG. 4, an encoder block 402 translates data from 64-bit XGMII data to the 66-bit data bus that is 64B/66B encoded (for example according to the IEEE 802.3ae standard). The FIFO clock tolerance block 404, which comprises a FIFO and could be implemented according to the circuits of FIGS. 1-3, is responsible for synchronizing the data packets to the higher speed interface clock domain. The write side of the FIFO clock tolerance block 404 removes all available idles and the second of a pair of consecutive ordered sets before writing into the FIFO, while the read side inserts idles as needed in order to keep the FIFO half full (as described above with respect to FIGS. 1-3). An example of an ordered set is the Sequence ordered-set, as defined in Section 48.4.2 of the IEEE 802.3ae standard for example, generally consist of combinations of special and data code groups. The FIFO clock tolerance block 404 also holds data for the gearbox/scrambler 406 so that it can properly transmit data. For example, the gearbox/scrambler 406 is used ensures sufficient transitions in the serial interface to support clock recovery and optical transmission. The gearbox/scrambler is used to translate the data bus from 66 bits to 64 bits wide, so that the 64 bits can be multiplexed into 16-bit data, such as 16 bit LVDS data. As can be seen, data is written to the FIFO using the Core_Clk and read from the FIFO using Clk_txqdr which is generated by the digital clock manager (DCM) 408 based upon a transmit clock (TXPCLKP).

Similarly, when receiving data, 16 bit LVDS data is coupled to a 1:4 demultiplexer 410 which outputs 64 bit data. A DCM 412, which is coupled to receive a receive signal clock, RXPCLK, outputs a clock Clk_ddr which is coupled to the demultiplexer 410, and a clock Clk_rxqdr which is used for writing data to the FIFO clock tolerance block 414. A framesync/descrambler block 416, which operates using the same polynomial as the gearbox/scrambler, is used to reverse the scrambling operation performed on the transmit side, so that the data can be properly decoded. Accordingly, the framesync/descrambler block 414 is used to translate data from a 64-bit non-aligned data bus to a 66-bit word aligned data bus, preferably by searching the data field for the two framesync bits. Finally, the 64B/66B Decoder outputs 64 bit data plus 8 control bits. The clock tolerance block 414, which also receives the Core_clk to read data, provides clock tolerance between the separate write clock (Clk_rxqdr) and read clock (Core_clk) as described above. A further discussion on FIG. 4 can be found in XAPP775, "10 Gigabit Ethernet/FibreChannel PCS Reference Design", August 2004 from Xilinx, Inc. which is herein incorporated by reference.

Figure 5:
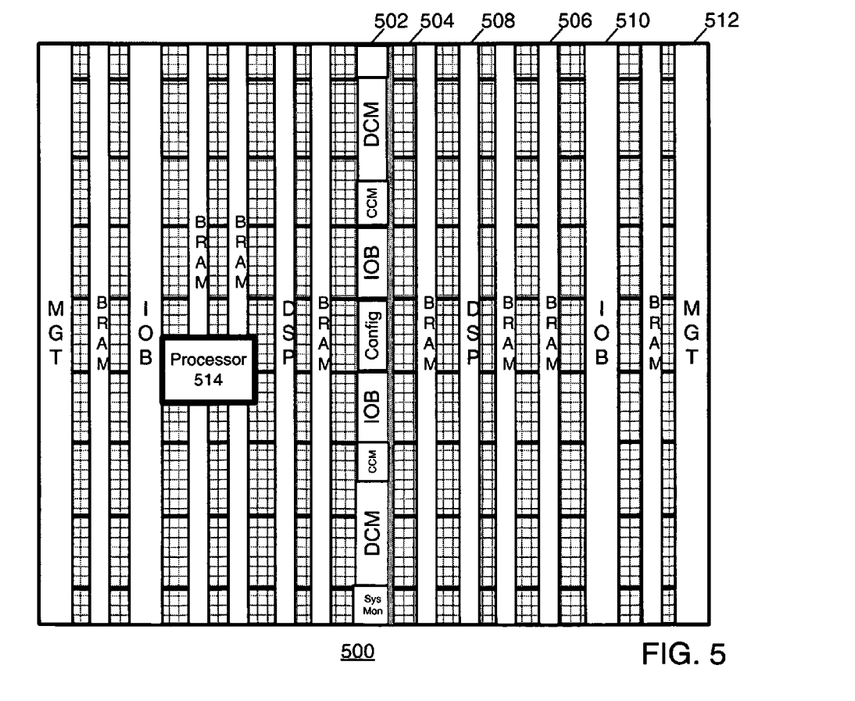
FIG. 5 is a block diagram of a circuit for implementing the circuits for buffering data according to an embodiment of the present invention.

Turning now to FIG. 5, a circuit for implementing the circuits for buffering data according to an embodiment of the present invention is shown. In particular, the circuitry of the FPGA 500 is laid out across the surface of a die as a plurality of columns of repeatable tiles. Although the majority of columns have substantially homogeneous circuits, a heterogeneous center column 502 has a variety of different circuits. For example, the circuit elements in column 502 may include a system performance monitor (SYSMON) circuit, a digital clock manager (DCM) circuit, a clock companion module (CCM) circuit, and configuration logic (CONFIG). The system performance monitor may include an analog-to-digital converter (ADC) to monitor parameters such as temperature and voltage both on-chip and off-chip. The DCM may include circuits to perform clock de-skew, clock phase shifting, clock frequency synthesis, and other clock features. The CCM may include circuits for phase-matched binary clock division and internal clock jitter & skew measurement. The configuration logic includes logic needed to address and load the configuration memory cells of the SRAM-based FPGA during configuration of the FPGA. The configuration logic in this example also may include configuration registers, boundary scan test circuitry such as JTAG circuitry, and encryption and/or decryption circuitry used to encrypt and/or decrypt bitstreams of configuration data loaded into and read out of the FPGA.

Each homogeneous column preferably has substantially identical circuit elements substantially filling the column. The substantially identical circuit elements in a column are of a particular circuit type from a group of circuit types that may include a Configurable Logic Block (CLB) type 504, a Block Random Access Memory (BRAM) type 506, a Digital Signal Processor (DSP) type 508, an Input/Output Block (IOB) type 510, and a Multi-Giga Bit Transceiver (MGT) type 512. The various elements of the programmable logic circuit of FIG. 1 are used to implement the various circuits described in FIGS. 2-6. Finally, the FPGA 500 may comprise an embedded processor 514. The embedded processor 514 could run software for enabling the removal and insertion of data blocks as described above. The programmable logic device could be, for example, one of the Virtex family of field programmable gate arrays available from Xilinx, Inc. of San Jose, Calif.

Figure 6:
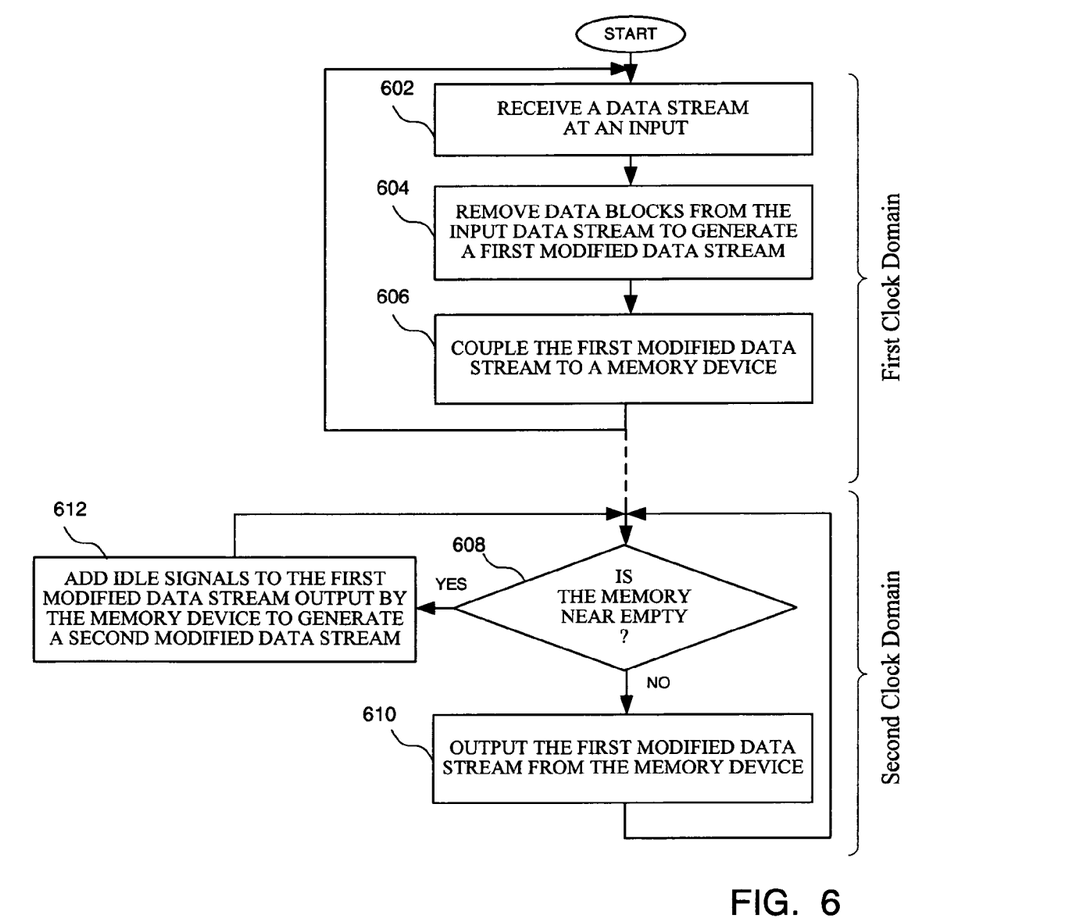
FIG. 6 is a method of buffering data received in a first clock domain and output in a second clock domain according to an embodiment of the present invention.

Turning now to FIG. 6, a method of buffering data received in a first clock domain and output in a second clock domain according to an embodiment of the present invention is shown. Because a circuit employing the method of FIG. 6, or the following FIGS. 7-9 operate in two clock domains, the loops in the first clock domain and the second clock domain run concurrently and are independent of each other, as can be seen in the figures. A data stream is received at an input at a step 602. Data blocks are removed from the input data stream to generate a first modified data stream at a step 604. The first modified data stream is coupled to a memory device at a step 606. It is then determined whether the memory is near empty at a step 608. The determination that the memory is near empty could be based upon a signal from the memory itself. Assuming that the memory is not near empty, the first modified data stream is output from the memory device at a step 610. If the memory is near empty, idle blocks are added to the first modified data stream output by the memory device to generate a second modified data stream at a step 612. The method of FIG. 6, as well as the following methods of FIGS. 7-9, could be implemented using the circuits of FIGS. 1-4 described above, or some other suitable circuit.

Figure 7:
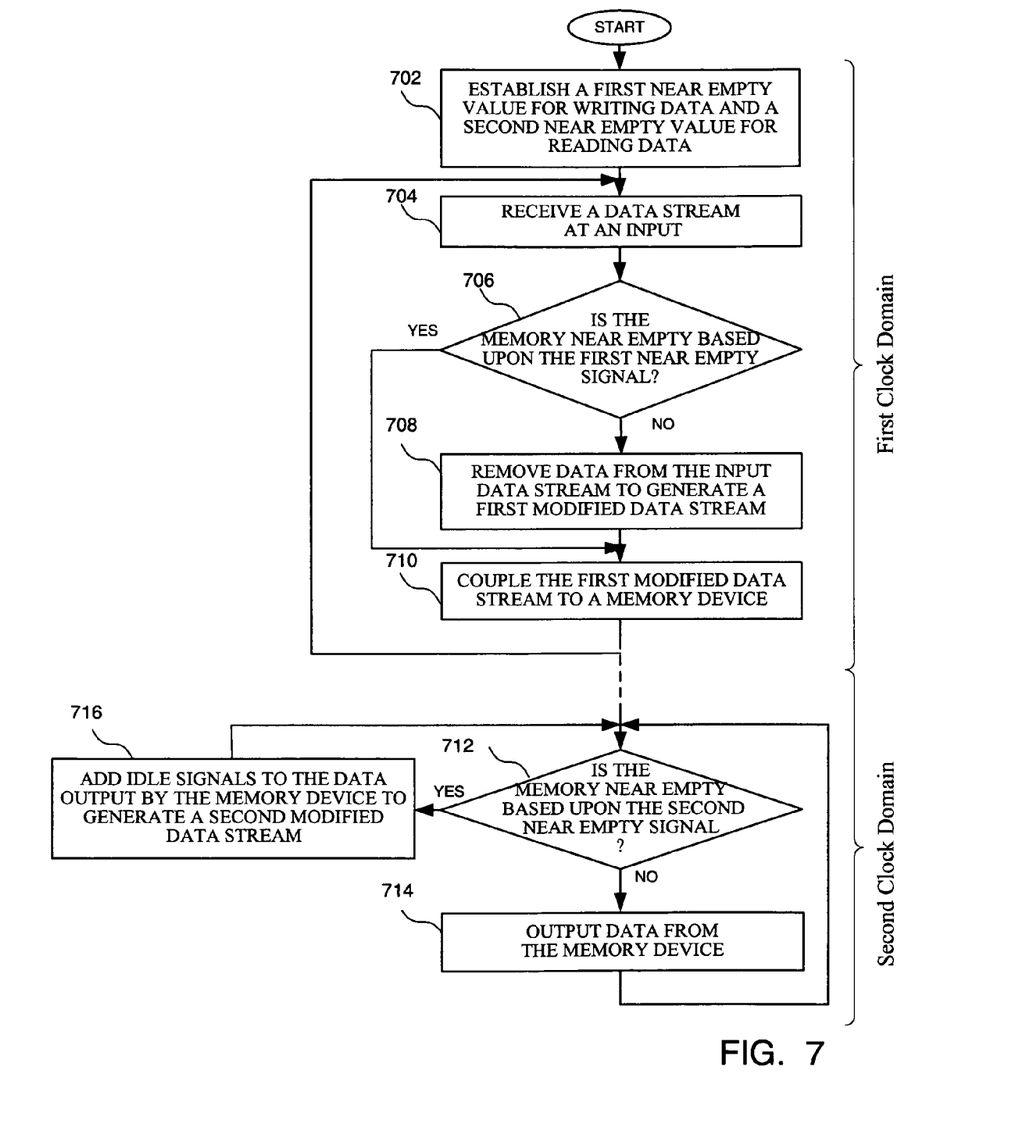
FIG. 7 is a method of buffering data by employing first and second near empty signals according to an embodiment of the present invention.

Turning now to FIG. 7, a method of buffering data by employing first and second near empty signals according to an embodiment of the present invention is shown. A first Near Empty value for writing data and a second Near Empty value for reading data are established at a step 702. That is, the threshold for generating Near Empty signals for the purposes of writing or reading data are established. A data stream is received at an input at a step 704. It is then determined whether the memory is near empty based upon the first Near Empty signal at a step 706. If not, data is removed from the input data stream to generate a first modified data stream at a step 708. Data from the data stream (i.e. either all of the data or data with idles removed) is coupled to a memory device at a step 710. It is then determined whether the memory is near empty based upon the second Near Empty signal at a step 712. If not, data is then output from the memory device at a step 714. If so, idle data blocks are added to the data output by the memory device to generate a second modified data stream at a step 716. It should be noted that the steps of removing data in step 708 and inserting data in step 716 are performed concurrently, and although they may be different, the Near Empty values are dependent upon each other. That is, because the one step affects the amount of data input to the memory and the other step affects the amount of data taken from the memory, the amount of data in the memory at any given time depends upon both steps.

Figure 8:
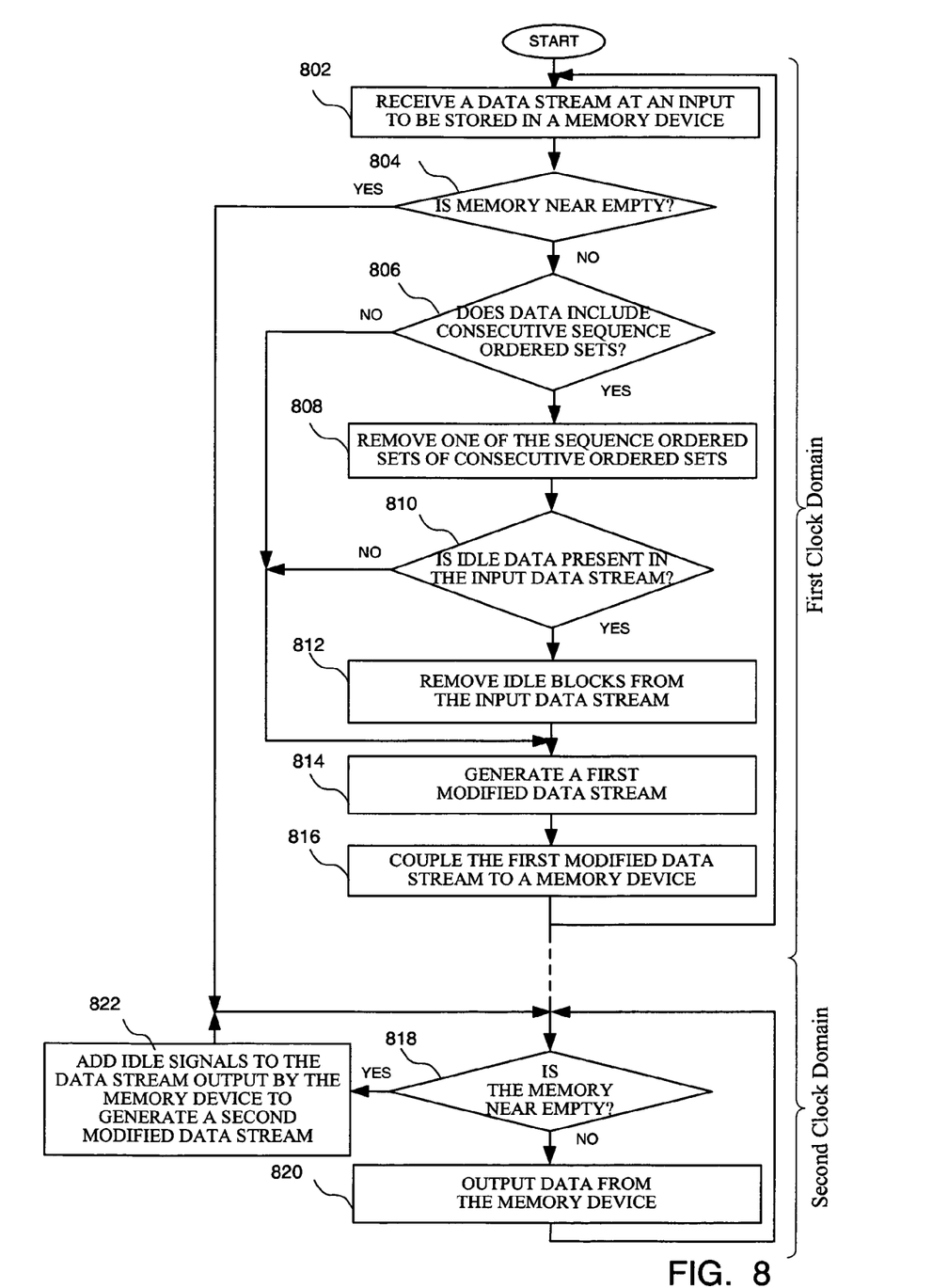
FIG. 8 is a method of selectively removing data blocks in a stream of data blocks according to an embodiment of the present invention.

Turning now to FIG. 8, a method of selectively removing data blocks in a stream of data blocks according to an embodiment of the present invention is shown. A data stream to be stored in a memory is received at an input at a step 802. It is then determined whether the memory is near empty at a step 804. If not, it is determined whether the data includes consecutive sequence ordered sets at a step 806. If so, one of the sequence ordered sets of the consecutive sequence ordered sets is removed at a step 808. It is also determined whether idle data is present in the input data stream at a step 810. If so, idle data blocks are removed from the input data stream at a step 812. A first modified data stream is then generated at a step 814. The first modified data stream is coupled to a memory device at a step 816. It is then determined whether the memory is near empty at a step 818. If not, data from the memory device is output at a step 820. If so, idle data block are added to the first modified data stream output by the memory device to generate a second modified data stream at a step 822.

Figure 9:
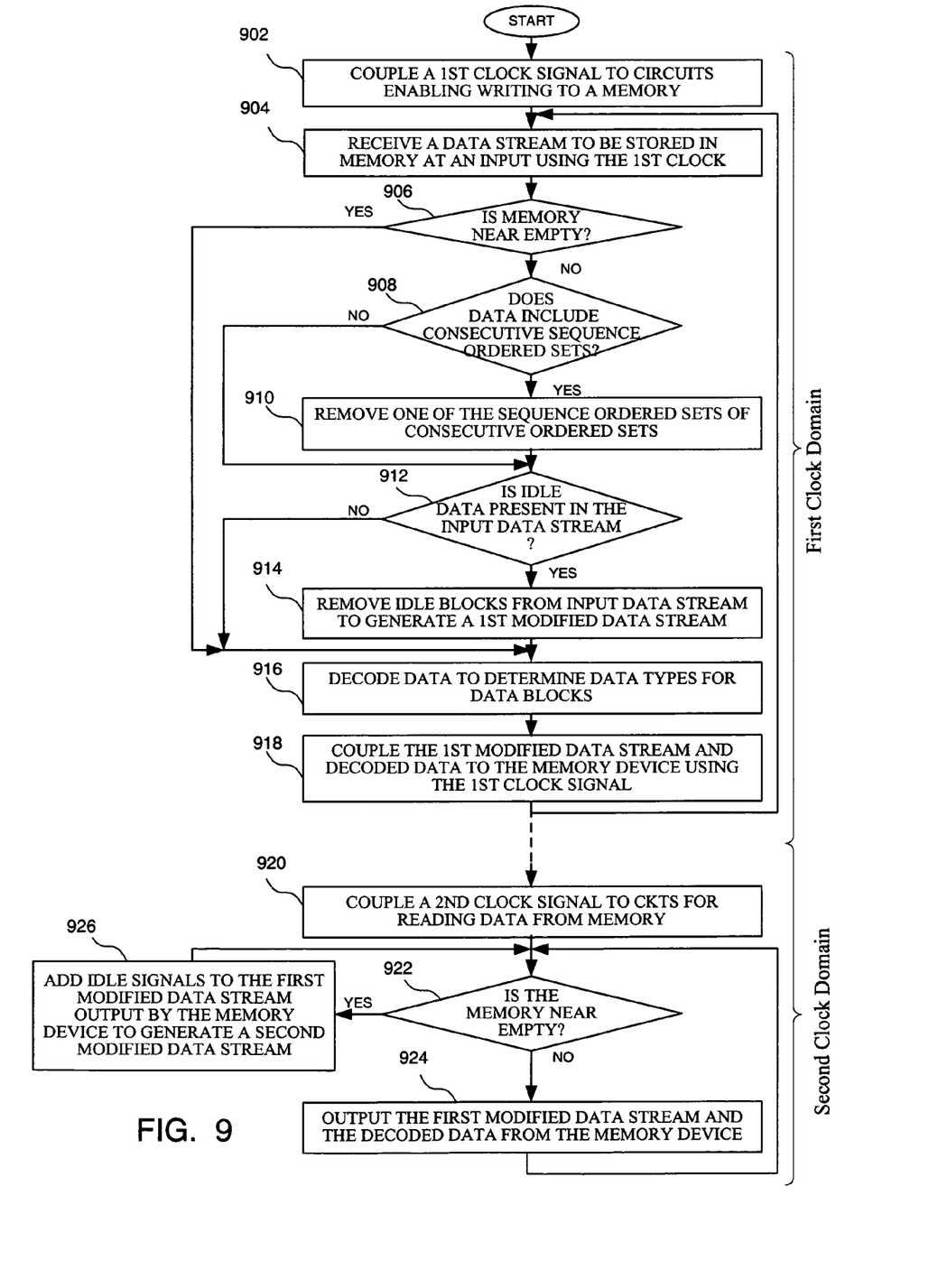
FIG. 9 is a method of decoding data to be buffered according to an embodiment the present invention.

Turning now to FIG. 9, a method of decoding data to be buffered according to an embodiment the present invention is shown. A first clock signal is coupled to circuits enabling writing data to a memory device at a step 902. A data stream to be stored in the memory device is received at an input using the first clock signal at a step 904. It is then determined whether the memory is near empty at a step 906. If not, it is determined whether the data includes consecutive sequence ordered sets at a step 908. If so, one of the sequence ordered sets of the consecutive ordered sets is removed at a step 910. It is also determined whether idle data is present in the input data stream at a step 912. If so, idle data blocks are removed from the input data stream to generate a first modified data stream at a step 914. If the memory is near empty at the step 906, data blocks are not removed. Accordingly, the first modified data stream could include all of the original data, either because the memory is near empty, or there is no data which could be removed.

After any data to be removed is removed, data is then decoded to determine the data type of data blocks at a step 916. The data blocks of the first modified data stream and the decoded data are coupled to the memory device using the first clock signal at a step 918. A second clock signal is coupled to circuits for reading data from the memory device at a step 920. It is then determined whether the memory is near empty at a step 922. If not, the first modified data stream and the decoded data are output from the memory device at a step 924 using the second clock signal. If so, idle signals are added to the first modified data stream output by the memory device to generate a second modified data stream at a step 926.

It can therefore be appreciated that the new and novel circuit for and method of buffering data in an integrated circuit has been described. It will be appreciated by those skilled in the art that numerous alternatives and equivalents will be seen to exist which incorporate the disclosed invention. As a result, the invention is not to be limited by the foregoing embodiments, but only by the following claims.

APPENDIX

// Verilog code excerpt module opt_fifo_new (/*AUTOARG*/
  // Outputs
  readdata, spill,
  // Inputs
  rclk, readen, wclk, writen, writedata, rst
  );
  input rclk;
  input readen;
  output [65:0] readdata;reg [65:0] readdata;
  output spill;wire spill;
  input wclk;
  input writen;
  input [65:0] writedata;
  input rst;
  parameter FIFO_FULL = 0; // setting this to 1 results in FIFO staying mostly full otherwise it is mostly empty.
  parameter FIFO_ALMOSTFULL = 4; // Cutoff for inserting idle when FIFO_FULL is set
  parameter FIFO_ALMOSTEMPTY = 3; // Cutoff for inserting idle when FIFO_FULL is not set
  reg

```
wr_ctrl_idle,wr_idle_seq,wr_seq_idle,wr_seq1,wr_seq2,
wr_data,wr_idle_start,wr_seq_start,wr_term ,wr_term_d,
wr_term_dd;
    wire [23:0] seq_data;
    wire wr_ctrl,wr_seq,wr_start;
    reg [69:0] wfifo_data;
    reg wfifo_en;
    wire [2:0] wr_count,rd_count;
    reg [23:0] seq_data_r;
    wire seq_repeat;

// reg seq_repeat;
    reg insert_idle;
    wire [69:0] rfifo_data;
    reg rd_en;
    reg [1:0] spill_rr,spill_ww;
    wire read_term,read_idle;
    wire control_block;
    reg [65:0] writedata_d;
    reg write_enable;
    reg seq1, seq2;
    assign control_block = (writedata[1:0] == 2'b01);
    assign wr_ctrl = (control_block & (writedata[9:2] == 8'h
        1e));
    assign wr_seq = wr_seq1 & wr_seq2;
    assign seq_data = (seq2) ? writedata_d[65:42] : (seq1) ?
        writedata_d[33:10] : 24'h000000;
    assign wr_start = (wr_idle_start | (writedata_d[9:0] ==
        10'h1e1) | wr_seq_start);
    // register sequence data check for repeats
    always@(posedge wclk) begin
        writedata_d <= writedata;
        seq2 <= control_block & !(|writedata[41:38]) & (((writ-
            edata[9:2] == 8'h2d) & !(|writedata[37:10])) | (writ-
            edata[9:2] == 8'h55));
        seq1 <= control_block & (((writedata[9:2] == 8'h4b) &
            !(|writedata[65:38]) & !(|writedata[37:34])) | ((writ-
            edata[9:2] == 8'h55) & !(|writedata[41:38])));
        wr_ctrl_idle <= (wr_ctrl) & !(|writedata[65:10]);
        wr_idle_seq <= control_block & (writedata[9:2] ==
            8'h2d) & !(|writedata[37:10]) & !(|writedata[41:38]);
        wr_seq_idle <= control_block & (writedata[9:2] ==
            8'h4b) & !(|writedata[65:38]) & !(|writedata[37:34]);
        wr_seq1 <= control_block & (writedata[9:2] == 8'h55)
            & !(|writedata[37:34]);
        wr_seq2 <= control_block & (writedata[9:2] == 8'h55)
            & !(|writedata[41:38]);
        wr_idle_start <= control_block & (writedata[9:2] ==
            8'h33) & !(|writedata[37:10]);
        wr_seq_start <= control_block & (writedata[9:2] ==
            8'h66) & !(|writedata[37:34]);
        wr_term <= control_block & (writedata[9] == 1'b1);
        wr_term_dd <= control_block & (writedata[9:8] ==
            2'b11);
        // We are only allowed to remove consecutive ordered
            sets.
        if(wr_idle_seq | wr_seq | wr_seq_idle)
            seq_data_r <= 'TPDB seq_data;
        else
            seq_data_r <= 'TPDB 24'hFFFFFF;
// seq_repeat <= (seq_data == seq_data_r);
        write_enable <= writen;
    end
    assign seq_repeat = (seq_data == seq_data_r);
    // write all data except idles, and/or repeated seq ordered
        sets
    always@(posedge wclk or posedge rst)
        if(rst) begin
            wfifo_en <= 'TPDB 1'b1;
            wfifo_data <= 'TPDB 70'h0;
            wr_term_d <= 'TPDB 1'b0;
        end
        else if(write_enable) begin
            wr_term_d <= 'TPDB wr_term_dd;
            // need to make sure idle following terminate is
                written into fifo
            if(((wr_ctrl_idle & !wr_term_d) | seq_repeat) & (wr-
                _count >= FIFO_ALMOSTFULL)) begin
                // dont write idles unless FIFO is almost empty
                wfifo_en <= 'TPDB 1'b0;
                wfifo_data <= 'TPDB 70'h0;
            end
            else begin
                wfifo_en <= 'TPDB 1'b1;
                wfifo_data <= 'TPDB {(wr_seq_start | wr_idle-
                    _start |wr_ctrl_idle),wr_start,wr_term,(wr_ctr-
                    l_idle | wr_idle_seq | wr_seq_idle | wr_seq),
                    writedata_d};
            end
        end
    fifo_70x15 tx_fifo (
        .din(wfifo_data),
        .wr_en(wfifo_en & write_enable),
        .wr_clk(wclk),
        .rd_en(rd_en & readen),
        .rd_clk(rclk),
        .ainit(rst),
        .dout(rfifo_data),
        .full(full),
        .empty(empty),
        .wr_count(wr_count),
        .rd_count(rd_count));
    assign 'TPDA read_term = rfifo_data[67];
    assign 'TPDA read_idle = rfifo_data[66]; // can insert idle
        after // read FIFO and insert idles // We are only allowed to insert idles.
    always@(posedge rclk or posedge rst)
        if(rst) begin
            rd_en <= 'TPDB 1'b0;
            readdata <= 'TPDB {64'h000000000000001e,
                2'b01};
            insert_idle <= 'TPDB 1'b1;
        end
        else if(readen) begin
            if((read_idle | read_term) & ((FIFO_FULL == 1 &
                rd_count < FIFO_ALMOSTFULL) |(FIFO_F-
                ULL== 0 & rd_count < FIFO_AL-
                MOSTEMPTY))) begin //insert idle if not too full
                and T
                rd_en <= 'TPDB 1'b0;
                insert_idle <='TPDB 1'b1;
                readdata <= 'TPDB rfifo_data[65:0];
            end
            else if(insert_idle) begin
                readdata <= 'TPDB {64'h000000000000001e,
                    2'b01};
                if((FIFO_FULL == 1 & rd_count > FIFO_AL-
                    MOSTFULL) | (FIFO_FULL == 0 & rd_count
                    > FIFO_ALMOSTEMPTY)) begin
                    insert_idle <= 'TPDB 1'b0;
                    rd_en <= 'TPDB 1'b1;
                end
```

```
        else begin
            rd_en <= `TPDB 1'b0;
            insert_idle <= `TPDB 1'b1;
        end
    end
    else begin
        rd_en <= `TPDB 1'b1;
        insert_idle <= `TPDB 1'b0;
        readdata <= `TPDB rfifo_data[65:0];
    end
end // stretch spills so that they are properly detected across boundaries
always@(posedge wclk or posedge full)
    if(full)
        spill_ww <= `TPDB 2'b11;
    else
        spill_ww <= `TPDB {spill_ww[0],1'b0};
always@(posedge rclk or posedge empty)
    if(empty)
        spill_rr <= `TPDB 2'b11;
    else
        spill_rr <= `TPDB {spill_rr[0],1'b0};
assign spill = spill_ww[1] | spill_rr[1];
endmodule // opt_fifo
```

The invention claimed is:

1. A circuit for buffering data received in a first clock domain and output in a second clock domain, said circuit comprising:
   a first circuit coupled to receive a stream of data blocks using a first clock signal, said first circuit removing idle data blocks from said stream of data blocks to create a first modified data stream, wherein said first circuit removes an ordered set of a pair of consecutive ordered sets of said stream of data;
   a memory device coupled to receive said first modified data stream and to selectively output data blocks of said first modified data stream;
   a second circuit coupled to said memory device to generate a second modified data stream using a second clock signal, said second modified data stream comprising said data blocks of said first modified data stream and idle data blocks inserted among said data blocks of said first modified data stream; and
   wherein said first circuit removes said idle signal blocks and said ordered set of said pair of consecutive ordered sets when said memory device is not near empty, wherein said pair of consecutive ordered comprises a Sequence ordered-set.

2. The circuit of claim 1 wherein said memory device comprises a first-in first-out memory.

3. A circuit for buffering data received in a first clock domain and output in a second clock domain, said circuit comprising:
   a data source generating a stream of data blocks;
   a data removal circuit coupled to receive said stream of data blocks using a first clock signal, said data removal circuit removing idle data blocks from said stream of data blocks to create a first modified data stream;
   a first-in first-out memory coupled to receive said first modified data stream and selectively outputting data blocks of said first modified data stream;
   a data insertion circuit coupled to said first-in first-out memory and generating a second modified data stream using a second clock signal, said second modified data stream comprising said data blocks of said first modified data stream and idle data blocks inserted among said data blocks of said first modified data stream;
   a first near empty signal generated by said first-in first-out memory and coupled to said data removal circuit; and
   a second near empty signal generated by said first-in first-out memory and coupled to said data insertion circuit, said second near empty signal having a higher threshold than said first near empty signal.

4. The circuit of claim 3 wherein said second clock signal comprises a clock signal having a faster rate than said first clock signal.

5. The circuit of claim 3 further comprising decoded information generated by said data removal circuit and included in said second modified data stream.

6. A method of buffering data received in a first clock domain and output in a second clock domain, said method comprising the steps of:
   receiving a stream of data blocks using a first clock signal;
   removing data blocks to create a first modified data stream;
   coupling said first modified data stream to a first-in first-out memory;
   selectively outputting data blocks of said first modified data stream from said first-in first-out memory;
   generating a second modified data stream using a second clock signal, said second modified data stream comprising said data blocks of said first modified data stream and idle data blocks inserted among said data blocks of said first modified data stream; and
   wherein said step of removing data blocks to create a first modified data stream comprises a step of removing idle data blocks unless a near empty signal is received from said memory device.

7. The method of claim 6 wherein said step of removing data blocks to create a first modified data stream comprises a step of removing ordered sequence sets of pairs of consecutive ordered sequence sets unless a near empty signal is received from said memory device.

8. The method of claim 6 further comprising a step of generating a first near empty signal for writing data to said first-in first-out memory and a second near empty signal for reading data from said memory device.

9. The method of claim 8 wherein said second near empty signal has a higher threshold than said first near empty signal.

10. The method of claim 8 wherein said step of selectively outputting data blocks of said first modified data stream comprises a step of outputting said data blocks unless a second near empty signal is generated by said first-in first-out memory.

11. The method of claim 10 further comprising a step of inserting idle data blocks among said data blocks of said first modified data stream.

12. The method of claim 6 further comprising a step of coupling a first clock signal for receiving data to said memory device.

13. The method of claim 12 further comprising a step of coupling a second clock signal for outputting data to said memory device.

14. The method of claim 13 wherein said step of coupling a second clock signal for outputting data to said memory device comprises a step of coupling a second clock signal which is faster than said first clock signal.

* * * * *